United States Patent
Fanty et al.

(10) Patent No.: US 10,403,272 B1
(45) Date of Patent: Sep. 3, 2019

(54) FACILITATING PARTICIPATION IN A VIRTUAL MEETING USING AN INTELLIGENT ASSISTANT

(71) Applicant: Nuance Communications, Inc., Burlington, MA (US)

(72) Inventors: Mark Fanty, Norfolk, MA (US); Simona Gandrabur, Quebec (CA)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/201,775

(22) Filed: Mar. 7, 2014

Related U.S. Application Data

(60) Provisional application No. 61/773,991, filed on Mar. 7, 2013.

(51) Int. Cl.
*G10L 21/00* (2013.01)
*G10L 15/22* (2006.01)

(52) U.S. Cl.
CPC .................................. *G10L 15/22* (2013.01)

(58) Field of Classification Search
CPC ... G10L 15/22; G10L 15/26; G10L 2015/228; G10L 15/00; G10L 15/08; G10L 15/1822; G10L 15/02; G10L 15/1815; G10L 15/265; G06F 17/30867; G06F 17/28; G06F 9/542; H04M 2201/40; H04M 2201/41
USPC ........ 704/275, 270.1, 270, 231, 9, 257, 200; 379/88.01, 88.22
See application file for complete search history.

(56) References Cited

U.S. PATENT DOCUMENTS

| | | | |
|---|---|---|---|
| 6,356,869 B1 * | 3/2002 | Chapados et al. | 704/275 |
| 7,593,520 B1 * | 9/2009 | Croak et al. | 379/202.01 |
| 2003/0005174 A1 * | 1/2003 | Coffman et al. | 709/318 |
| 2004/0186743 A1 * | 9/2004 | Cordero, Jr. | 705/1 |
| 2006/0234719 A1 * | 10/2006 | Demirhan | H04W 72/02 455/453 |
| 2006/0294453 A1 * | 12/2006 | Hirata | 715/500.1 |
| 2007/0168194 A1 * | 7/2007 | Bodin | G06Q 10/109 704/270 |
| 2007/0207782 A1 * | 9/2007 | Tran | H04L 29/06027 455/414.1 |
| 2007/0239885 A1 * | 10/2007 | Vadlakonda et al. | 709/232 |
| 2008/0117838 A1 * | 5/2008 | Yee | H04M 3/569 370/260 |

(Continued)

*Primary Examiner* — Dwayne D Bost
*Assistant Examiner* — Stephen M Brinich
(74) *Attorney, Agent, or Firm* — Wolf, Greenfield & Sacks, P.C.

(57) ABSTRACT

An intelligent assistant can be used to facilitate an end user's participation in a virtual meeting. The intelligent assistant can receive recognized speech from a speech recognition engine, and then forward the recognized speech to a natural language understanding engine which in turn ascribes a meaning to the recognized speech. The ascribed meaning can include a semantic representation of the recognized speech and thereby a semantic representation of voice commands enshrined within the recognized speech. Using the ascribed meaning, the intelligent assistant then searches for meeting information associated with the virtual meeting and uses that meeting information to join the end user to the virtual meeting. Meeting information can include a conference call number, a participant code, a moderator code or a link to an online meeting.

17 Claims, 2 Drawing Sheets

(56) References Cited

U.S. PATENT DOCUMENTS

| | | | |
|---|---|---|---|
| 2010/0138224 A1* | 6/2010 | Bedingfield, Sr. | G10L 15/22 704/275 |
| 2014/0095171 A1* | 4/2014 | Lynch et al. | 704/275 |
| 2015/0073789 A1* | 3/2015 | Hashimoto et al. | 704/235 |
| 2015/0141005 A1* | 5/2015 | Suryavanshi | H04L 67/125 455/434 |

* cited by examiner

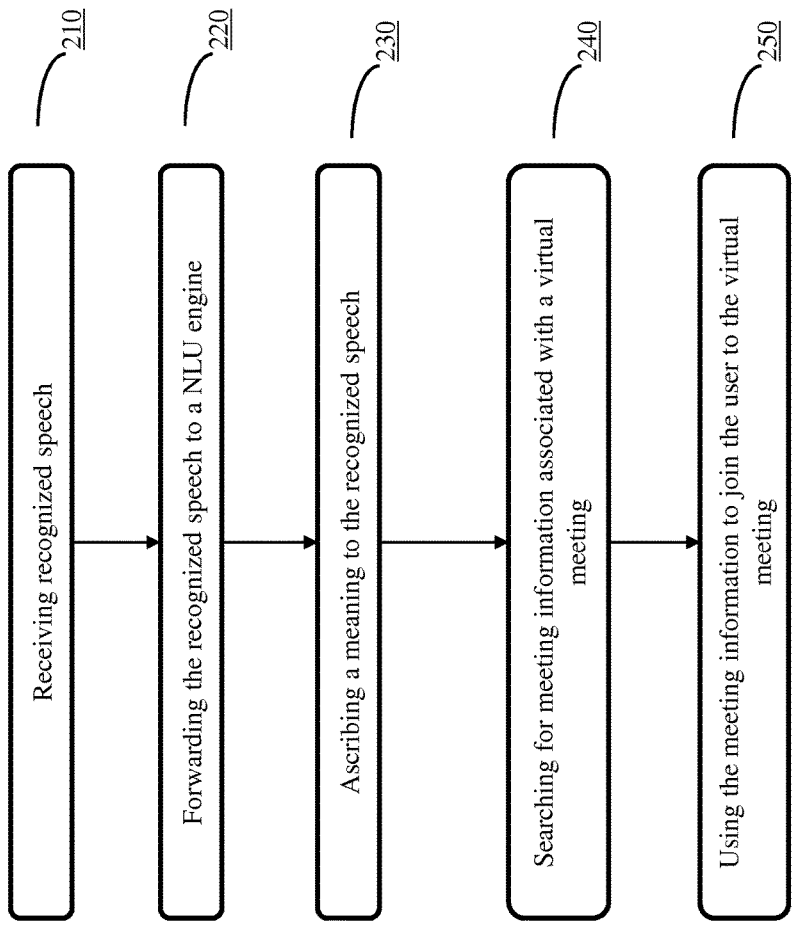

FACILITATING PARTICIPATION IN A VIRTUAL MEETING USING AN INTELLIGENT ASSISTANT

CROSS-REFERENCE TO RELATED APPLICATIONS

The present application claims priority to U.S. Provisional Patent Application Ser. No. 61/773,991 filed on Mar. 7, 2013, the disclosure of which is hereby incorporated by reference.

FIELD OF THE DISCLOSURE

The present disclosure relates generally to intelligent systems, and in particular, relates to an intelligent assistant that facilitates participation in a virtual meeting.

BACKGROUND

Natural language understanding and voice commands are increasingly used in conjunction with mobile devices to provide end users with a seamless hands free user experience. Many mobile devices use intelligent assistants to interact with end users and permit the end user to accomplish tasks with their mobile devices without manually inputting information. For example, an intelligent assistant can receive a voice input such as "Call Home" and interpret that input as a command to call a particular phone number. Similarly, intelligent assistants can interpret a voice input such as "What is the Weather" as a request to go online and determine the temperature and other weather characteristics at a particular location. In this example, the intelligent assistant may go even further and determine the location of the mobile device on which it is executing before obtaining weather related information.

Some tasks carried out by intelligent assistants include: searching the web, e-mailing, messaging, and placing phone calls. Intelligent assistants can accomplish these tasks and interact with the end user in variety of ways, such as through voice commands, gestures, or textual input. In addition, intelligent assistants can receive speech input from the user, and take actions in response to the speech. Determining what actions to take in response to input can be based upon a meaning or understanding ascribed to input by a natural language understanding system. Intelligent assistants can also provide feedback if a command is not understood, or instruct the user with regards to operating the computing device.

While current intelligent assistants can perform rudimentary tasks, few can perform complex functions such as joining an end user to a meeting after being given the verbal command "Join my Meeting." In order to respond to such a complex request, an intelligent assistant must use speech recognition, natural language understanding and contextual ontologies to carry out a complex set of actions. Thus there is a need for an intelligent assistant that can assist an end user by performing more complex actions.

SUMMARY

Joining a virtual meeting can be a time consuming process that rarely can be accomplished entirely in a hands-free mode using only voice commands. An end user must input a conference call number and often times a participant code; neither of these actions can be done entirely using voice prompts. Further, this process may not be feasible in environments where the end user does not have convenient access to this information, such as in an automobile. In many instances, the end user may have to rely on memory to dial a number or click on a link to join an online virtual meeting. This disclosure describes methods for addressing these problems by permitting an end user to use natural language understanding to interact with an intelligent assistant that can facilitate joining the end user to an online meeting with minimal end user involvement.

In one embodiment the disclosure describes a method, and corresponding intelligent assistant, for facilitating an end user's participation in a virtual meeting. An intelligent assistant executing on a device, receives recognized speech from a speech recognition system. The recognized speech may comprise a voice command generated by an end user of the device that instructs the device to join a virtual meeting. The intelligent assistant then forwards the received recognized speech to a natural language understanding (NLU) engine that ascribes a meaning to the recognized speech. Upon receiving the ascribed meaning of the recognized speech, the intelligent assistant can search for and obtain meeting information associated with the virtual meeting and subsequently join the end user to the virtual meeting using the obtained meeting information.

In another embodiment, the device receives an utterance comprising a voice command issued by the user, and transmits the received utterance to the speech recognition system to be recognized. The speech recognition system may then recognize the received utterance and output recognized speech.

In yet a further embodiment, the meaning ascribed by the NLU engine further comprises a semantic representation of the recognized speech.

In an additional embodiment, forwarding the received recognized speech to the NLU engine further comprises forwarding the received recognized speech to a NLU engine executing on a second device remote from the device.

In yet another embodiment, searching for meeting information associated with the virtual meeting further comprises receiving the ascribed meaning of the recognized speech, and then determining whether the ascribed meaning comprises a voice command that indicates the end user desires to join the virtual meeting.

In another embodiment, searching for meeting information associated with the virtual meeting further comprises searching for meeting information associated with the virtual meeting using contextual information associated with the device, the end user, a location of the device, a current date or a current time.

In an additional embodiment, joining the end user to the virtual meeting further comprises dialing a phone number associated with the virtual meeting and entering a participant code associated with the virtual meeting, wherein the phone number associated with the meeting can be obtained from a meeting appointment.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

FIG. 2 illustrates an embodiment of a process for facilitating virtual meetings.

DETAILED DESCRIPTION OF THE DISCLOSURE

Figure 1:
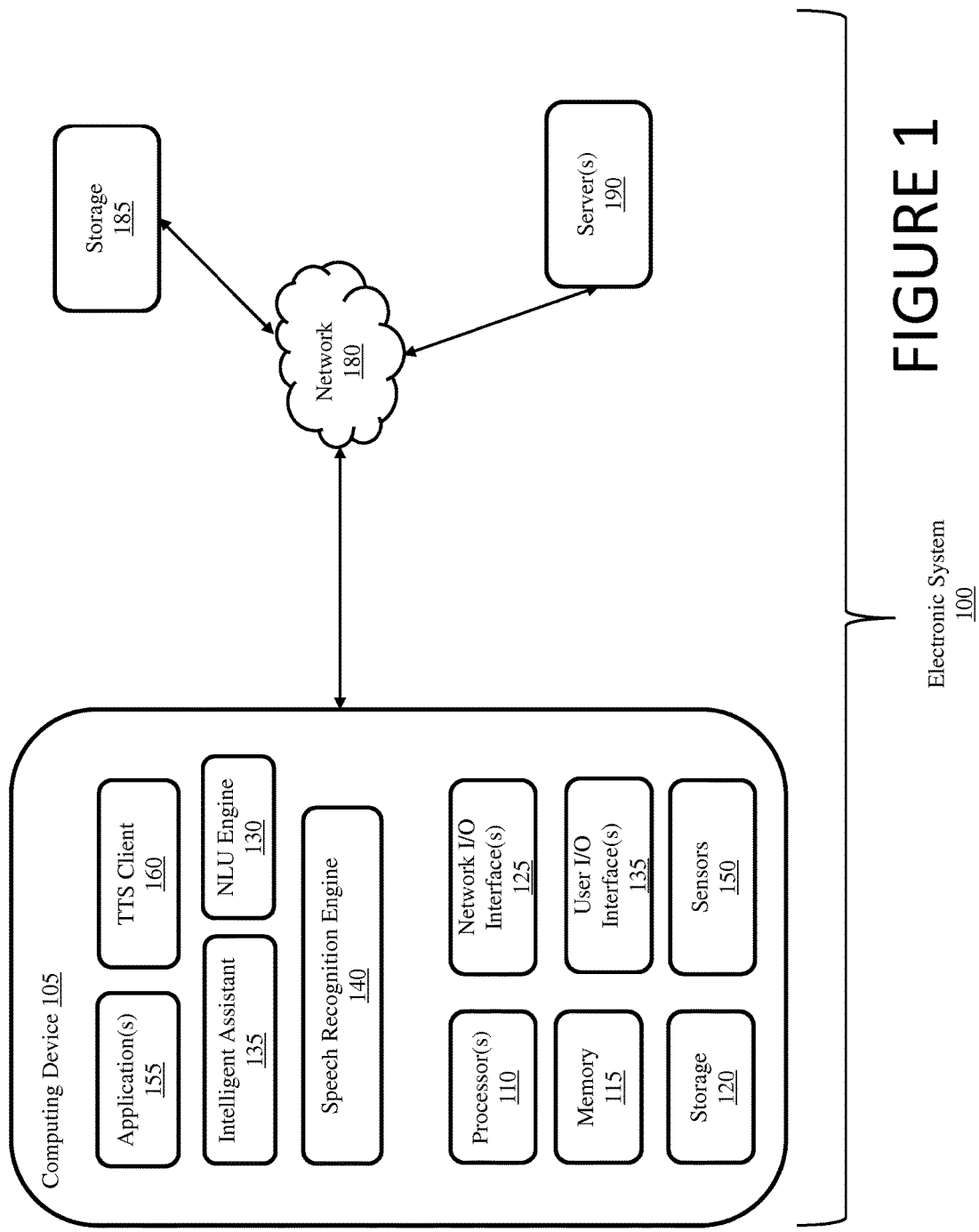
FIG. 1 illustrates an embodiment of a system that employs an intelligent assistant.

The present disclosure features a novel system and method for facilitating participation in a virtual meeting using an intelligent assistant. As discussed above, intelligent assistants have traditionally performed only simple commands in response to speech input. Described herein are intelligent assistants that use natural-language-understanding techniques to not only understand the intent of a recognized speech, but to also take complex actions in response to the understood language.

FIG. 1 is a block diagram illustrating an example embodiment of an electronic system 100 utilizing an intelligent assistant. The system 100 comprises a computing device 105, which may be a mobile phone, smart phone, conference phone, personal digital assistant, tablet device, networked game console, computer, laptop computer, or any other kind of electronic device. The computing device 105 may be wearable, such as a smart watch or pair of smart glasses. The computing device 105 may be embedded within clothing or a user's skin. In some instances, the device 105 may be attached to an end user's body such that the device 105 is an extension of the user's body. The computing device 105 may be embodied as a stand-alone system, or as a component of a larger electronic system within any environment, such as within an automobile, conference room, or office.

The computing device 105 can comprise a processor 110, memory 115, and storage 120. The processor 110 may be any hardware or software-based processor, and may execute instructions to cause any functionality, such as applications, clients, and other agents, to be performed. Instructions, applications, data, and programs may be located in memory 115 or storage 120. Further, an operating system may be resident on storage 120, which when loaded into memory 115 and executed by processor 110, manages most computing device hardware resources and provides common services for computing programs and applications to function.

The computing device 105 can communicate with other devices and computers via a network 180. The network can be any network, such as the Internet or a local Bluetooth network. In some embodiments, the computing device 105 can communicate with one or more storage systems 185, servers 190, or other sites, systems, or devices hosting external services to access remote data or remotely executing applications.

Further, the computing device 105 may access the network 180 via one or more network input/output (I/O) interfaces 125. The network I/O interfaces 125 allow the computing device 105 to communicate with other computers or devices, and can comprise either hardware or software interfaces between equipment or protocol layers within a network. For example, the network I/O interfaces may comprise Ethernet interfaces, frame relay interfaces, cable interfaces, DSL interfaces, token ring interfaces, wireless interfaces, cellular interfaces, and the like.

An end user may interact with the computing device 105 and electronic system 100 via one or more user I/O interfaces 135. User I/O interfaces 135 may comprise any input or output devices that allow an end user to interact with the computing device 105. For example, input devices may comprise a keyboard, touchscreen, microphone, camera, mouse, touchpad, trackball, five-way switch, joystick, and/or any combination thereof. Output devices can comprise a screen, speaker, printer, and/or any combination thereof. Thus, the end user may interact with the device by speaking, tapping, gesturing, or using a combination of multiple input modes. In turn, the computing device 105 or other component may respond with any combination of visual, aural, or haptic output. The computing device 105 may manage the user I/O interfaces 135 and provide a user interface to the end user by executing a stand-alone application residing in storage 120. Alternately, a user interface may be provided by an operating system executing on the computing device 105.

Additionally, the computing device 105 may contain a number of sensors 150 that can monitor variables regarding an end user, the computing device 105, and/or a local environment. Sensors 150 may include sensors that monitor the electromagnetic spectrum, device orientation, acceleration, or user's heart rate. Accordingly, the sensors 150 may comprise an infrared sensor, gyroscope, accelerometer, biosensors, cameras, or any other sensor capable of sensing light, motion, temperature, magnetic fields, gravity, humidity, moisture, vibration, pressure, sound, electrical fields, or other aspects of the natural environment.

The computing device 105 may further comprise a number of applications 155, which may be implemented either in hardware or software. The applications may make use of any component of the computing device 105 or electronic system 100. Further, the applications may be located on an external server 190 or access data stored on external storage 185. In such cases, the computing device 105 may access applications 155 through network 180 via the network I/O interfaces 125.

Applications 155 may comprise any kind of application. In one embodiment, the computing device 105 includes a calendar application that contains an end user's schedule, meetings, and other related information. In other embodiments, applications 155 may relate to the end user's workload, schedule, or project list. Still other embodiments may include applications 155 related to social networking, sports, GPS navigation, e-mail, shopping, music, or movies. Further, applications 155 may communicate and exchange data with other applications executing on the computing device 105.

In some instances, applications 155 can include an application for determining the geographic location of the device 105. For example, the location application can communicate with a remote satellite to determine the geographic coordinates of the device 105. Upon receiving the geographic coordinates, the location application can forward the coordinates to any application executing on the device 105 that wishes to know the current location of the device 105.

Computing device 105 may feature a speech recognition engine 140, which can process incoming user speech to generate recognized words. Generally, speech recognition may be performed by analyzing incoming speech signals using any combination of acoustic, statistical, or language models. The speech recognition engine 140 can communicate with a speech recognizer executing on a remote computer or server 190. In this embodiment, the speech recognition engine 140 may locally cache speech recognition content and algorithms so that limited speech recognition can be performed locally within the computing device 105. When additional speech recognition resources are required, the speech recognition engine 140 can communicate with a remote speech recognition system to access or retrieve the additional resources necessary to recognize complex speech signals. In at least one embodiment, the entire speech recognition system can reside on the computing device 105.

In some instances the speech recognition engine 140 can perform speech recognition together with a speech recognizer executing on a device located remote from the device 105. In other instances, the speech recognition engine 140 can independently perform limited speech recognition on the device 105 without the assistance of a remote speech recognizer.

Sometimes it is advantageous to not only recognize the content of a speech signal, but also to understand the meaning of the speech. In this case, recognized speech may be further processed by a natural language understanding (NLU) engine 130. The NLU engine 130 may utilize contextual or environmental cues, such as a user's profile information, to better determine the meaning of an utterance. The determined meaning may be used by applications 155 executing on the device to execute a corresponding action or command.

In some embodiments, the speech recognition engine 140 and NLU engine 130 are combined. Further, speech recognition and natural language processing may be performed locally, or in a distributed configuration with some or all operations taking place at a server 190 or using externally available services or data.

An intelligent assistant 135 may be implemented on the computing device 105, allowing for enhanced levels of interaction with the device by an end user. The intelligent assistant 135 may execute entirely on the computing device 105, while in other embodiments a portion of the intelligent assistant 135 can execute within the computing device 105 while other portions of the intelligent assistant 135 can execute remotely on a server 190, computer, or other device accessible to the electronic system via the network 180. While this disclosure refers to an intelligent assistant, in other embodiments the intelligent assistant 135 can be referred to as a personal assistant, virtual agent, or assistant.

The intelligent assistant 135 may manipulate, gather data, and send data from or to any component of the computing device 105 and electronic system 100. Generally, the intelligent assistant 135 improves the efficiency and processing of tasks ultimately desired by the end user. For example, the intelligent assistant 135 may assist the end user in placing a phone call by processing a natural language query. Upon determining that the end user would like to place a phone call, the intelligent assistant 135 may identify the recipient of the phone call in a contacts directory, and then place a call to the recipient on behalf of the end user. Additionally, the intelligent assistant may vocalize a response to the end user using a text-to-speech (TTS) client 160, and play the response aloud over a speaker or other output device.

In addition to responding to natural language queries, the intelligent assistant 135 may be more proactive, and perform other actions either autonomously or in response to detected events. For example, the intelligent assistant 135 may compare the number of an incoming phone call against a white pages, yellow pages, Yelp, or Google Places listing in order to identify the caller or provide other relevant information. Further, the intelligent assistant 135 may examine data from a calendar application and determine that an end user's upcoming meeting includes a conference call. In response to this determination, the intelligent assistant 135 may automatically connect the end user to the conference call at the time of the meeting.

FIG. 2 is a flow diagram illustrating a method 200 of facilitating an end user's participation in a virtual meeting. An intelligent assistant 135 receives recognized speech from a speech recognition engine 140 (Step 210) and forwards the recognized speech to the NLU engine 130 (Step 220). The NLU engine 130 then ascribes a meaning to the recognized speech (Step 230) and sends the ascribed meaning back to the intelligent assistant 135. The intelligent assistant 135 then searches for meeting information associated with a virtual meeting (Step 240) and uses any found meeting information to join the end user to the virtual meeting (Step 250).

Further referring to FIG. 2, and in more detail, the intelligent assistant 135 receives recognized speech from the speech recognition engine 140 (Step 210) after the speech recognition engine recognizes an utterance. The device 105 can be configured to receive speech input or an utterance via microphones installed on the device 105. Upon receiving speech or voice input, software executing on the device 105 can forward the received speech signal corresponding to the speech input or utterance to the speech recognition engine 140. When the speech recognition engine 140 is a thick client such that the speech recognition engine 140 can perform speech recognition on the device 105, the speech recognition engine 140 inputs the speech signal and outputs recognized speech. In instances where the speech recognition engine 140 works in conjunction with a speech recognizer executing on a second device remote from the device 105, the speech recognition engine 140 functions as a thin client that offloads a portion of the speech recognition to the speech synthesizer. When the speech recognition engine 140 functions as a thin client in a distributed speech recognition system, the speech recognition engine 140 inputs the speech signal, transmits preliminary speech recognition information to the remote speech recognizer, and receives the recognized speech from the speech recognizer.

The utterance received by the device 105 and captured by microphones on the device 105 typically comprises a voice command that is generated by an end user of the device 105. In some instances, this command includes natural language that directs the intelligent assistant 135 and by proxy the device 105 to perform an action. The voice command is not apparent to the system 100 until the utterance is recognized by the speech recognition engine 140 and outputted to the intelligent assistant 135.

Upon receiving the recognized speech from the speech recognition engine 140, the intelligent assistant 135 forwards the recognized speech to the NLU engine 130 executing on the device 105 (Step 220). The NLU engine 130 uses various natural language analysis methods to determine the meaning of the recognized speech. In some instances, the NLU engine 130 can use contextual information to determine the meaning or intent of the recognized speech. For example, the NLU engine 130 can obtain a current time, or the time of day at the time when the voice command is issued and within the location that the voice command originates, and use the current time to determine the meaning of the user's voice command. The NLU engine 130 can also obtain contextual information such as: the location of the device 105 and therefore the user; the time of day; whether the device 105 is near the user's place of employment; whether the user is within a car or the user's car; the weather; or similar information. Additionally, the NLU engine 130 can use contextual information gleaned from applications and data used or generated by the end user. For example, the NLU engine 130 can pull contextual information from the user's: emails; Twitter feeds; Facebook posts; Instagram posts; blog entries; task entries; or documents recently edited by the user. Similarly, the NLU engine 130 can pull contextual information from the user's calendar(s), to-do lists, contact list, or call log. Contextual information can therefore relate to the user, the user's data, the user's applications, the device 105, the location of the device, or any other component within the system 100. Using this contextual information, the NLU engine 130 can determine the intent behind an utterance.

Typically the NLU engine 130 executing on the device 105 functions as a thin client such that it organizes and performs a preliminary analysis on recognized speech and contextual information, however upon performing the preliminary analysis, the NLU engine 130 sends the recognized speech and the contextual information to a NLU system executing on another device remote from the mobile device 105. The bulk of the NLU algorithms and analysis occurs on the remote NLU system, and the NLU engine 130 receives the output from the remote NLU system and passes it along to the intelligent assistant 135. In some instances, the NLU engine 130 can function as a thick client such that substantially all of the NLU processing occurs on the device 105 and is carried out by the NLU engine 130.

Upon carrying out NLU processing on the recognized speech, the NLU engine 130 ascribes a meaning or intent to the recognized speech (Step 230). In some instances the ascribed meaning can include a semantic representation of the recognized speech. For example, upon receiving recognized speech that includes speech output that instructs the device 105 or intelligent assistant 135 to join a virtual meeting, the NLU engine 130 could obtain the speech and use contextual information such as the time of day and the content of the end user's calendar to ascribe meaning to the speech. In this instance, the meaning or semantic representation could be a command to initiate a virtual meeting scheduled in the user's calendar and join the user to the virtual meeting. Ascribing meaning or a semantic representation to the recognized speech permits the intelligent assistant to understand the voice command issued by the end user such that the intelligent assistant can take a series of actions in response to the command.

The intelligent assistant receives the meaning or intent of the recognized speech from the NLU engine 130 and uses the ascribed meaning along with contextual information to search for meeting information associated with a virtual meeting (Step 240). In some instances, the intelligent assistant 135 determines, prior to searching for meeting information, that the intent or meaning of the recognized speech was to command the intelligent assistant 135 to facilitate having the end user join a virtual meeting.

When searching for meeting information associated with a virtual meeting, the intelligent assistant 135 uses the ascribed meaning of the recognized speech together with contextual information to find relevant meeting information. Contextual information can be any contextual information gathered by the NLU engine 130 including contextual information associated with the device 105, contextual information associated with the end user or contextual information associated with a location of the device, a current date or a current time.

For example, the intelligent assistant 135 receives semantic information associated with the recognized speech indicating that the end user issued a voice command to join a virtual meeting. In response to this command, the intelligent assistant 135 may gather information about the location of the device, the current date, the current time and the user. Upon gathering the contextual information, the intelligent assistant 135 can interact with a calendar application executing on the device 105, or calendar information stored on the device 105, to find entries matching the current date and current time.

User contextual information can be used to determine which calendar to query. A device 105 may store or have access to multiple calendars, and in some instances multiple calendars associated with multiple end users. The calendar application may also provide meeting information for multiple calendars, such as the end user's personal calendar, a public or "group" calendar, and another end user's calendar. In some instances, the calendar application may also be executing either locally or remotely. If executing remotely, the intelligent assistant 135 simply queries for meeting information by executing an internet function call.

As utilized herein, the term "meeting information" may refer to any information describing a meeting between two or more persons. Meeting information may include the time, date, and location of the meeting. Meeting information may also include an online conference call site, phone number, passcode, participant list, attachment, or other metadata. Meeting information may be in textual, audio, or any other format. The intelligent assistant 135 may determine other types of meeting information by analyzing data from the calendar application or multiple calendar applications; for example, the intelligent assistant may identify conflicting or adjacent meetings by comparing meeting times for meetings from one or more calendars.

Meeting information can be further processed to identify information about an associated virtual meeting that may be facilitated by the intelligent assistant. As utilized herein, the term virtual meeting refers to any method of remote interaction with other human beings that can be managed by the intelligent assistant 135. For example, a virtual meeting could be a simple phone call with one or more persons attending the meeting. Alternately, the virtual meeting could be an internet-based conference call, such as a Skype Group Call, Google Hangout, or WebEx event. A virtual meeting may comprise audio, video, or text-based interaction, or any such combination of methods of interaction.

Determining whether the meeting information includes conference call information can be performed in any manner. In one embodiment, textual information describing the meeting is parsed for a conference call phone number and passcode or participant code. For example, the textual information may contain the phrase "conference call number: 1-800-555-1212; participant code 9876", which would indicate to the intelligent assistant 135 that the telephone number following the phrase "conference call number" should be used to connect to the conference call. Parsing textual information may occur using regular expressions or by any other method. In another embodiment, the calendar application may use an API that allows for direct querying of conference call information associated with a meeting. In another embodiment, the calendar application may contain fields directed towards conference call information that can be queried by the intelligent assistant 135. Alternately, the intelligent assistant 135 may gather and store conference call information separately from the calendar application. For example, the intelligent assistant 135 may infer conference call information for a meeting based on past meeting invitations, similar meetings, or user behaviors taken or recorded at the time of other meetings or interactions. The intelligent assistant 135 may also directly query the end user to determine if there is associated conference call information for a meeting.

Once the intelligent assistant 135 obtains meeting information, the intelligent assistant can join the end user to the virtual meeting (Step 250). In one instance, if it is determined that the meeting information does not include conference call information, then the intelligent assistant 135 may abandon the current method and proceed with other tasks, or wait for further instruction. Alternately, the intelligent assistant 135 may continue to monitor the user's actions to determine if a conference call associated with the meeting occurs at a later time. For example, the user may connect to a particular website or call a particular number concurrently with the start time of the meeting. If such a determination occurs, the intelligent assistant 135 may decide to "link" the meeting information to the detected conference call, and provide other services related to the call (e.g., display a participant list, meeting notes, etc.).

In another instance, if it is determined that the meeting information includes conference call information, and then the intelligent assistant 135 may prompt the end user to automatically connect to the conference call. Prompting may occur by way of a text alert, pop-up window, sound alert, dialog, or vocalized expression using TTS client 160. The end user may then provide an affirmative response, which may comprise speech, a manual interaction with the computing device such as a key press or tap, or any other form of interaction between the end user and the intelligent assistant 135. If the affirmative response is speech based, it may be processed by NLU engine 130 to identify the meaning of the response (e.g., the end user speaks "sure," "OK," "why not" as opposed to a simple "yes"). When the affirmative response is received, the intelligent assistant then automatically connects to the conference call.

Joining the end user to the virtual meeting can include dialing a conference call number and entering a participant code for the user. The intelligent assistant can obtain the conference call number and the participant code from a meeting appointment in a calendar associated with the end user. In other instances, joining the meeting can include instantiating an online meeting through which the user can participate using voice-over-IP and/or video. In some instances, the intelligent assistant 135 can make the choice to participate over video based on the location of the device 105. For example, if the intelligent assistant 135 determines that the device 105 is located within the end user's car, then the intelligent assistant 135 joins the user to the virtual online meeting only using audio.

An alternate method to facilitate joining a conference call can include notifying the end user that the intelligent assistant 135 plans to automatically connect to a conference call as opposed to prompting for a response. If the end user fails to provide an instruction to the contrary, the intelligent assistant 135 may automatically connect to the conference call. In still other embodiments, the intelligent assistant may abort connecting to the conference call if the user fails to respond or otherwise acknowledge the notification or prompting.

Connecting to the conference call may occur at the time of the meeting or a short time before. Connecting may comprise dialing into a meeting over a wireless or wired connection. In other embodiments, connecting may comprise connecting to a web-based meeting over the internet.

Still additional embodiments of facilitating a user joining a virtual meeting can include permitting an intelligent assistant to manage additional functionality related to the conference call. For example, in some embodiments, the intelligent assistant 135 can manage the call for the end user by not only dialing into the meeting, but managing functionality such as call persistence, muting, replaying of the attendance list, entering in of a passcode, and call disconnection. Information required for such functions may be obtained from the meeting information or any other source. The intelligent assistant 135 may also monitor the conversation, detect when new participants enter the meeting, inform the end user, and update the meeting information.

Further, meeting information may be displayed or vocalized by the intelligent assistant 135 during the virtual meeting. This may occur automatically, or in response to a request from the end user. In some embodiments, if the intelligent assistant 135 is not initially aware of a conference call associated with the meeting but later determines that a current call is associated with a meeting, it may "link" the meeting information to the current call and display the appropriate information.

Having described an embodiment of the technique described herein in detail, various modifications and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for facilitating a user's participation in a virtual meeting using an intelligent assistant executing on a device, the method comprising:
   receiving, by an intelligent assistant executing on a device, recognized speech from a speech recognition system, wherein the recognized speech comprises a voice command issued by a user of the device, the voice command instructing the device to join a virtual meeting;
   providing the received recognized speech to a natural language understanding (NLU) engine, the NLU engine ascribing a meaning to the recognized speech, wherein the ascribed meaning corresponds to the voice command issued by the user; and
   in response to determining that the ascribed meaning of the recognized speech comprising the voice command indicates a desire to join the virtual meeting, accessing the virtual meeting with the device, wherein accessing the virtual meeting with the device comprises:
      obtaining meeting access information for accessing the virtual meeting from the user's calendar, email, to-do list, and/or contact list without receiving manual input of the meeting access information from the user; and
      joining the device to the virtual meeting using the obtained meeting access information.

2. The method of claim 1, further comprising:
   receiving, by the device, an utterance comprising a voice command issued by the user;
   transmitting the received utterance to the speech recognition system to be recognized, wherein the speech recognition system recognizes the received utterance and outputs the recognized speech; and
   displaying, to the user, participants in the virtual meeting.

3. The method of claim 2, wherein:
   providing the received recognized speech to the NLU engine further comprises forwarding the received recognized speech to a NLU engine executing on a second device remote from the device.

4. The method of claim 2, wherein obtaining meeting access information for accessing the virtual meeting further comprises searching for meeting access information for accessing the virtual meeting using contextual information associated with the device.

5. The method of claim 2, wherein obtaining meeting access information for accessing the virtual meeting further comprises searching for meeting access information for accessing the virtual meeting using contextual information associated with a location of the device, a current date and a current time.

6. The method of claim 2, wherein joining the device to the virtual meeting further comprises:
   dialing a phone number for accessing the virtual meeting without receiving the phone number from the user; and
   entering a passcode for accessing the virtual meeting.

7. The method of claim 6, wherein obtaining the meeting access information comprises obtaining the phone number and/or the passcode for accessing the virtual meeting from a meeting appointment.

8. The method of claim 1, wherein joining the device to the virtual meeting using the meeting access information comprises prompting the user to confirm that the user desires joining the virtual meeting.

9. At least one non-transitory computer-readable storage medium having encoded thereon executable instructions that, when executed by at least one processor of a device, cause the at least one processor to carry out a method of operating an intelligent assistant to facilitate a user's participation in a virtual meeting, the method comprising:
   receiving recognized speech from a speech recognition system, wherein the recognized speech comprises a voice command generated by a user of the device, the voice command instructing the device to join a virtual meeting,
   providing the received recognized speech to a natural language understanding (NLU) engine, the NLU engine ascribing a meaning to the recognized speech, wherein the ascribed meaning corresponds to the voice command issued by the user, and
   in response to determining that the ascribed meaning of the recognized speech comprising the voice command indicates a desire to join the virtual meeting, accessing the virtual meeting with the device, wherein accessing the virtual meeting with the device comprises:
      obtaining meeting access information for accessing the virtual meeting from the user's calendar, email, to-do list, and/or contact list without receiving manual input of the meeting access information from the user; and
      joining the device to the virtual meeting using the obtained meeting access information.

10. The at least one computer-readable storage medium of claim 9, wherein the method further comprises:
    receiving an utterance comprising the voice command issued by the user,
    transmitting the received utterance to the speech recognition system to be recognized, wherein the speech recognition system recognizes the received utterance and outputs the recognized speech, and
    displaying, to the user, participants in the virtual meeting.

11. The at least one computer-readable storage medium of claim 10, wherein:
    the NLU engine executes on a second device remote from the device.

12. The at least one computer-readable storage medium of claim 10, wherein obtaining the meeting access information comprises searching for meeting access information for accessing the virtual meeting using contextual information associated with the device.

13. The at least one computer-readable storage medium of claim 10, wherein obtaining the meeting access information comprises searching for meeting access information for accessing the virtual meeting using contextual information associated with a location of the device, a current date and a current time.

14. The at least one computer-readable storage medium of claim 10, wherein joining the device to the virtual meeting comprises:
    dialing a phone number for accessing the virtual meeting without receiving the phone number from the user; and
    entering a passcode for accessing the virtual meeting.

15. The at least one computer-readable storage medium of claim 14, wherein obtaining the meeting access information comprises obtaining the phone number and/or the passcode for accessing the virtual meeting from a meeting appointment.

16. The at least one computer-readable storage medium of claim 9, wherein the device comprises a mobile device in possession of the user.

17. The at least one computer-readable storage medium of claim 9, wherein the method further comprises selecting a mode of communication of the device in the virtual meeting by selecting between:
    sending and receiving audio-only data, and
    sending and receiving both video data and audio data.

* * * * *